United States Patent
Durham et al.

(10) Patent No.: US 9,335,888 B2
(45) Date of Patent: May 10, 2016

(54) FULL 3D INTERACTION ON MOBILE DEVICES

(75) Inventors: Lenitra M. Durham, Beaverton, OR (US); David Durham, Beaverton, OR (US); Sangita Sharma, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 88 days.

(21) Appl. No.: 13/996,088

(22) PCT Filed: Dec. 27, 2011

(86) PCT No.: PCT/US2011/067376
§ 371 (c)(1),
(2), (4) Date: Jun. 20, 2013

(87) PCT Pub. No.: WO2013/100900
PCT Pub. Date: Jul. 4, 2013

(65) Prior Publication Data
US 2014/0245230 A1    Aug. 28, 2014

(51) Int. Cl.
G06F 3/048       (2013.01)
G06F 3/0481      (2013.01)
G06F 3/042       (2006.01)
G06F 3/0484      (2013.01)
G06F 3/0486      (2013.01)
G06F 3/01        (2006.01)

(52) U.S. Cl.
CPC ............ *G06F 3/04815* (2013.01); *G06F 3/017* (2013.01); *G06F 3/0425* (2013.01); *G06F 3/0486* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 7,098,891 B1* | 8/2006 | Pryor | 345/158 |
| 7,271,795 B2* | 9/2007 | Bradski | G06F 1/1626 |
| | | | 345/158 |
| 8,913,056 B2* | 12/2014 | Zimmer | G06T 15/20 |
| | | | 345/419 |
| 2003/0184576 A1* | 10/2003 | Vronay et al. | 345/719 |
| 2007/0180379 A1* | 8/2007 | Osato | 715/703 |
| 2008/0062126 A1 | 3/2008 | Algreatly | |

(Continued)

FOREIGN PATENT DOCUMENTS

| | | |
|---|---|---|
| JP | 2005004580 A | 6/2005 |
| JP | 2005178473 A | 7/2005 |

(Continued)

OTHER PUBLICATIONS

Office Action received for Taiwan Patent Application No. 101149605, mailed on Oct. 30, 2014, 24 pages including 10 pages of English translation.

(Continued)

*Primary Examiner* — Stephen Alvesteffer
(74) *Attorney, Agent, or Firm* — Jordan IP Law, LLC

(57) ABSTRACT

Systems and methods may provide for displaying a three-dimensional (3D) environment on a screen of a mobile device, and identifying a user interaction with an area behind the mobile device. In addition, the 3D environment can be modified based at least in part on the first user interaction. Moreover, the 3D environment may be modified based on movements of the mobile device as well as user interactions with the mobile device, allowing the user to navigate through the virtual 3D environment by moving the mobile/handheld device.

34 Claims, 4 Drawing Sheets

(56) References Cited

U.S. PATENT DOCUMENTS

| | | | |
|---|---|---|---|
| 2009/0102805 A1 | 4/2009 | Meijer et al. | |
| 2010/0045703 A1 | 2/2010 | Kornmann et al. | |
| 2010/0053151 A1* | 3/2010 | Marti et al. | 345/419 |
| 2010/0053324 A1* | 3/2010 | Kim et al. | 348/142 |
| 2010/0062811 A1* | 3/2010 | Park et al. | 455/566 |
| 2010/0100853 A1* | 4/2010 | Ciudad et al. | 715/856 |
| 2011/0261048 A1 | 10/2011 | Lee et al. | |
| 2012/0102438 A1* | 4/2012 | Robinson | G06F 3/011 715/863 |

FOREIGN PATENT DOCUMENTS

| | | |
|---|---|---|
| JP | 2009187426 A | 8/2009 |
| JP | 2010183378 A | 8/2010 |
| KR | 2010-0030968 A | 3/2010 |
| TW | 201137668 A | 11/2011 |
| WO | 2002/093352 A1 | 11/2002 |
| WO | 2011127646 A1 | 10/2011 |
| WO | 2013/100900 A1 | 7/2013 |

OTHER PUBLICATIONS

International Search Report and Written Opinion received for PCT Application No. PCT/US2011/067376, mailed on Sep. 26, 2012, 9 pages.

International Preliminary Report on Patentability and Written Opinion received for PCT Patent Application No. PCT/US2011/067376, mailed on Jul. 10, 2014, 6 pages.

Office Action for Korean Patent Application No. 2014-7017681, mailed on Jun. 18, 2015, 9 pages including 4 pages of English translation.

Office Action for Japanese Patent Application No. 2014-547174, mailed on Sep. 8, 2015, 10 pages including 5 pages of English translation.

European Search Report for EP Patent Application No. 11878547.6, dated Jul. 20, 2015, 6 pages.

Extended European Search Report for EP Patent Application No. 11878547.6, mailed Nov. 11, 2015, 12 pages.

* cited by examiner

FULL 3D INTERACTION ON MOBILE DEVICES

BACKGROUND

1. Technical Field

Embodiments generally relate to mobile device interactivity. More particularly, embodiments relate to the use of three-dimensional (3D) environments to enhance the interactivity of mobile devices.

2. Discussion

Conventional smart phones may have screens (e.g., displays) that are small relative to the content being displayed on the screen. For example, a typical desktop environment can include several windows, which may be difficult to view on a typical smart phone. While some solutions may have been developed in order to accommodate for the relatively small screen size, there remains considerable room for improvement. For example, conventional techniques to panning across displayed images may require finger "swipes" on the part of the user, wherein the fingers of the user can occlude the content on the screen. Similarly, zooming into and out of images may require finger "pinches" that also prevent at least a portion of the content from being viewed by the user.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include a mobile device having a screen and logic to display a three-dimensional (3D) environment via the screen. The logic can also identify a first user interaction with an area behind a mobile device, and modify the 3D environment based at least in part on the first user interaction.

Embodiments can also include an apparatus having logic to display a 3D environment via a screen of a mobile device, and identify a first user interaction with an area behind the mobile device. The logic may also be configured to modify the 3D environment based at least in part on the first user interaction.

Additionally, embodiments may include a non-transitory computer readable storage medium having a set of instructions which, if executed by a processor, cause a mobile device to display a 3D environment via a screen of the mobile device and identify a first user interaction with an area behind the mobile device. The instructions may also cause the mobile device to modify the 3D environment based at least in part on the first user interaction.

Other embodiments may involve a computer implemented method in which a 3D environment is displayed via a screen of a mobile device. The method can also provide for identifying a first user interaction with an area behind the mobile device, and modifying the 3D environment based at least in part on the first user interaction.

Figure 1:
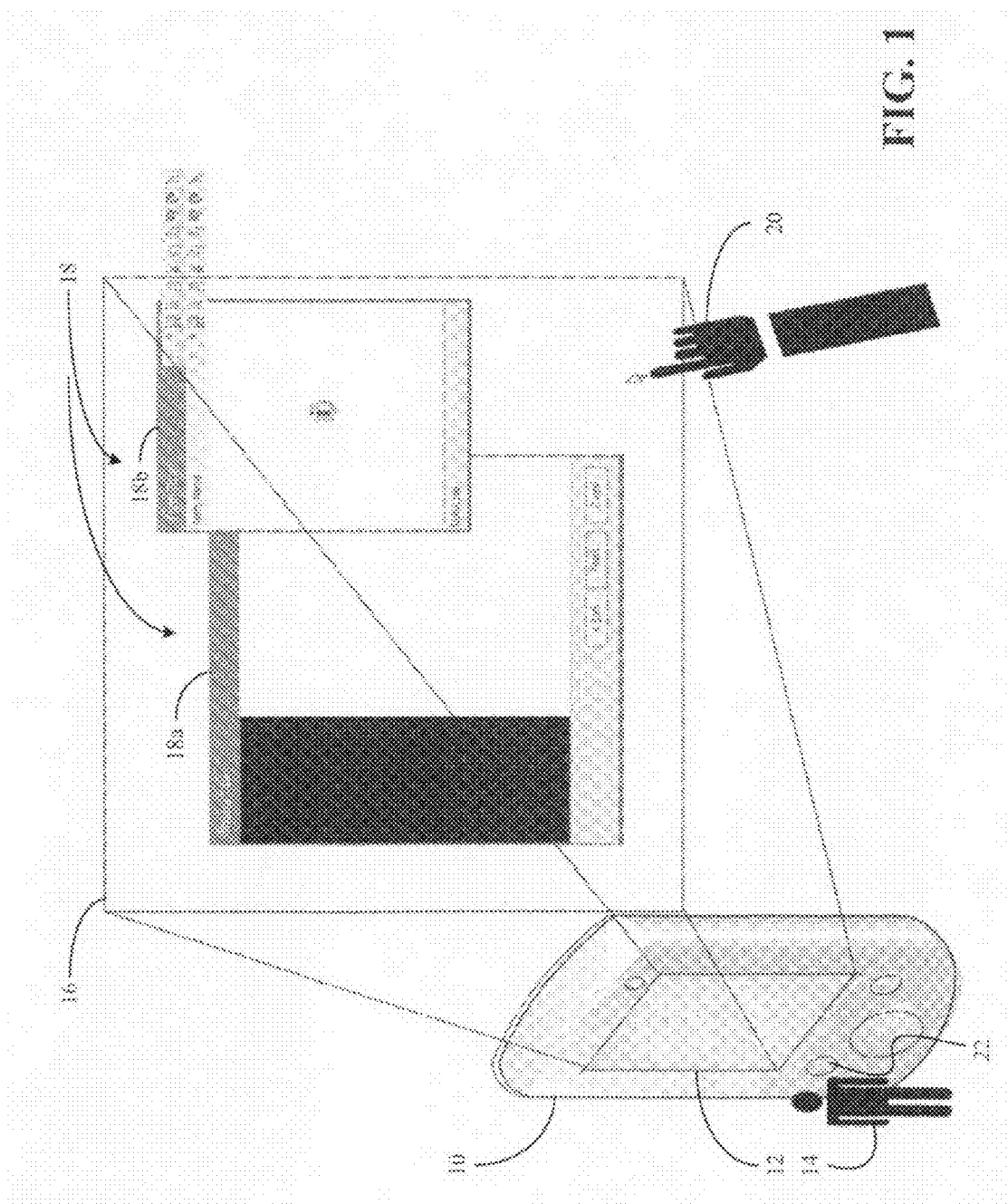
FIG. 1 is a perspective view of an example of a three-dimensional (3D) virtual desktop environment that is displayed via a screen of a mobile device according to an embodiment.

Turning now to FIG. 1, a mobile device 10 is shown, wherein the mobile device 10 has a screen 12 (e.g., liquid crystal display/LCD, touch screen, stereoscopic display, etc.) that is viewable by a user 14. The mobile device 10 could be, for example, a smart phone, mobile Internet device (MID), notebook computer, or other similar device in which the size of the screen 12 is relatively small. In the illustrated example, a 3D environment 16 is displayed on the screen 12 so that it appears to be located at some distance behind the mobile device 10 when viewed from the front of the mobile device 10. The 3D environment 16 may include, for example, a virtual desktop environment in which multiple windows 18 (18a, 18b) appear to be much larger than the screen 12. The location of the windows 18 could be "in-air" (e.g., floating) or "pinned" to some external surface behind the mobile device 10 such as a physical desktop, wall, etc.

In general, the user 14 may hold the mobile device 10 in one hand and use another "free hand" 20 to interact with the 3D environment 16. The user interactions with the 3D environment 16 could involve activity related to, for example, cursor movement operations, click operations, drag and drop operations, pinch operations, selection operations, object rotation operations, and so forth, wherein the mode of conducting the operations may vary depending upon the circumstances. For example, if the 3D environment 16 is pinned to an external surface such as a physical desktop, the user 14 might select the windows 18 by tapping on the external surface with the index (or other) finger of the free hand 20. In such a case, the mobile device 10 may include a rear image sensor and/or microphone (not shown) to detect the tapping (e.g., user interaction) and perform the appropriate click and/or selection operation in the 3D environment 16. For example, the rear image sensor might use pattern/object recognition techniques to identify various hand shapes and/or movements corresponding to the tapping interaction. Similarly, the microphone may be able to identify sound frequency content corresponding to the tapping interaction. Other user interactions such as drag and drop motions and pinch motions may also be identified using the rear image sensor and/or microphone.

Thus, if the illustrated window 18b is currently the active window (e.g., in the forefront of the environment) and the index finger of the free hand 20 taps on the external surface at a location corresponding to the other window 18a, the mobile device 10 can respond by making the other window 18a the active window (e.g., moving it to the forefront of the environment). Of particular note is that such an approach may enable the external surface to provide tactile feedback to the user 14. As will be discussed in greater detail, if the 3D environment 16 is an in-air environment (e.g., not pinned to an external surface), tactile feedback may be provided by another component such as an air nozzle, on the device, configured to blow a puff of air at the free hand 20 in response to detecting the user interaction.

The user 14 could also move the index finger of the free hand 20 to the desired location and use the hand holding the mobile device 10 to interact with a user interface (UI) of the mobile device 10 such as a button 22 to trigger one or more operations in the 3D environment 16. The button 22 may therefore effectively function as a left and/or right click button of a mouse, with the free hand 20 of the user 14 functioning as a coordinate location mechanism of the mouse. For example, the button 22 might be used as an alternative to tapping on the external surface in order to click on or otherwise select the windows 18. Thus, the user 14 may simply move the free hand 20 to point to the desired location in the 3D environment 16 and use the other hand to press the button 22 and initiate the click/selection operation. Additionally, the button 22 may be used in order to conduct more complicated operations such as drag and drop or pinch operations.

As already noted, the 3D environment 16 may alternatively be implemented as an in-air environment that is not pinned to a particular external surface. In such a case, the movements of the free hand 20 may be made relative to in-air locations corresponding to the windows 18 and other objects in the 3D environment 16. The mobile device 10 may also be equipped with an air nozzle (not shown) that provides tactile feedback in response to the user interactions with the 3D environment 16.

The illustrated mobile device 10 may also enable implementation of a unique approach to pan and zoom operations. In particular, the user 14 can pan (e.g., scroll left, right, up or down) across the 3D environment 16 by simply moving the free hand 20 in the desired direction to the edge of the scene, wherein the rear image sensor may detect the motions of the free hand 20. Another approach to panning may be for the user 14 to tilt/move the mobile device 10 in the direction of interest, wherein the mobile device 10 can also be equipped with a motion sensor and/or front image sensor (not shown) that may work in conjunction with the rear image sensor in order to convert movements of the mobile device 10 into pan operations. Either approach may enable the virtual environment displayed via the screen 12 to appear to be much larger than the screen 12.

Moreover, the motion sensor and/or front image sensor may work in conjunction with the rear image sensor in order to convert movements of the mobile device 10 into zoom operations. In particular, the front image sensor could determine the distance between the mobile device 10 and the face of the user 14, and the rear image sensor could determine the distance between the mobile device 10 and the free hand 20 of the user 14 and/or external surface, wherein changes in these distances may be translated into zoom operations. Thus, the user 14 might zoom into a particular region of the 3D environment 16 by moving the mobile device 10 away from the face of the user 14 and towards the region of interest in the 3D environment (e.g., as with a magnifying glass). Similarly, the user 14 could zoom out of a particular region of the 3D environment 16 by moving the mobile device towards the face of the user 14 and away from the region in question. Such an approach to conducting zoom operations may further enable relatively large virtual environments to be displayed via the screen 12. Moreover, by basing the 3D environment modifications on user interactions that occur behind the mobile device 10, the illustrated approach obviates any concern over the fingers of the free hand 20 occluding the displayed content during the user interactions.

Figure 2:
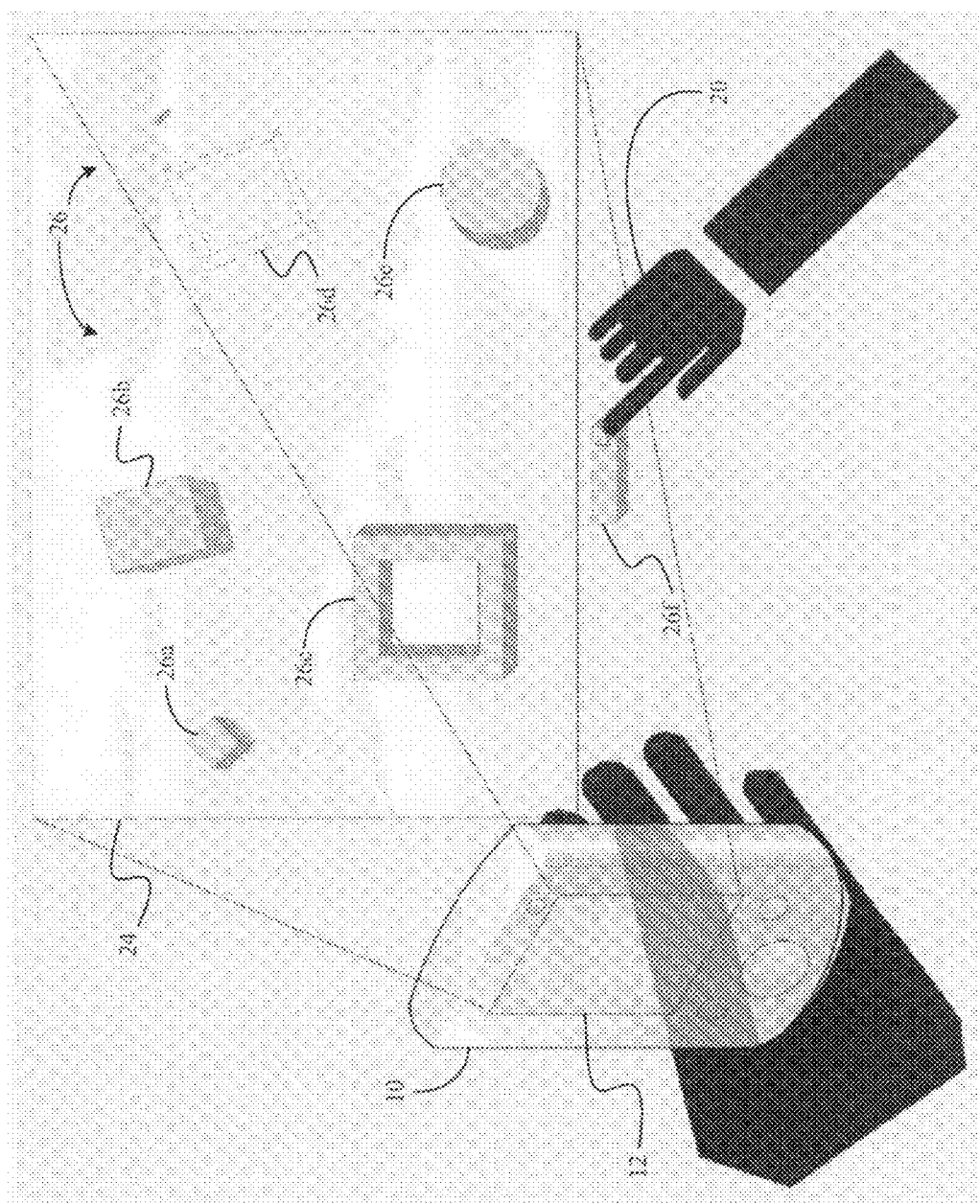
FIG. 2 is a perspective view of an example of an alternative 3D virtual environment that is displayed via a screen of a mobile device according to an embodiment.

FIG. 2 shows another 3D environment 24 in which one or more 3D objects 26 (26a-26f) are displayed via the screen 12 of the mobile device 10. In the illustrated example, the user's free hand 20 is able to select, rotate and otherwise manipulate the objects 26 by interacting with the area behind the mobile device 10. A wide variety of virtual environments such as gaming environments, workflow environments, etc., may be rendered and modified in the manner shown.

Figure 3:
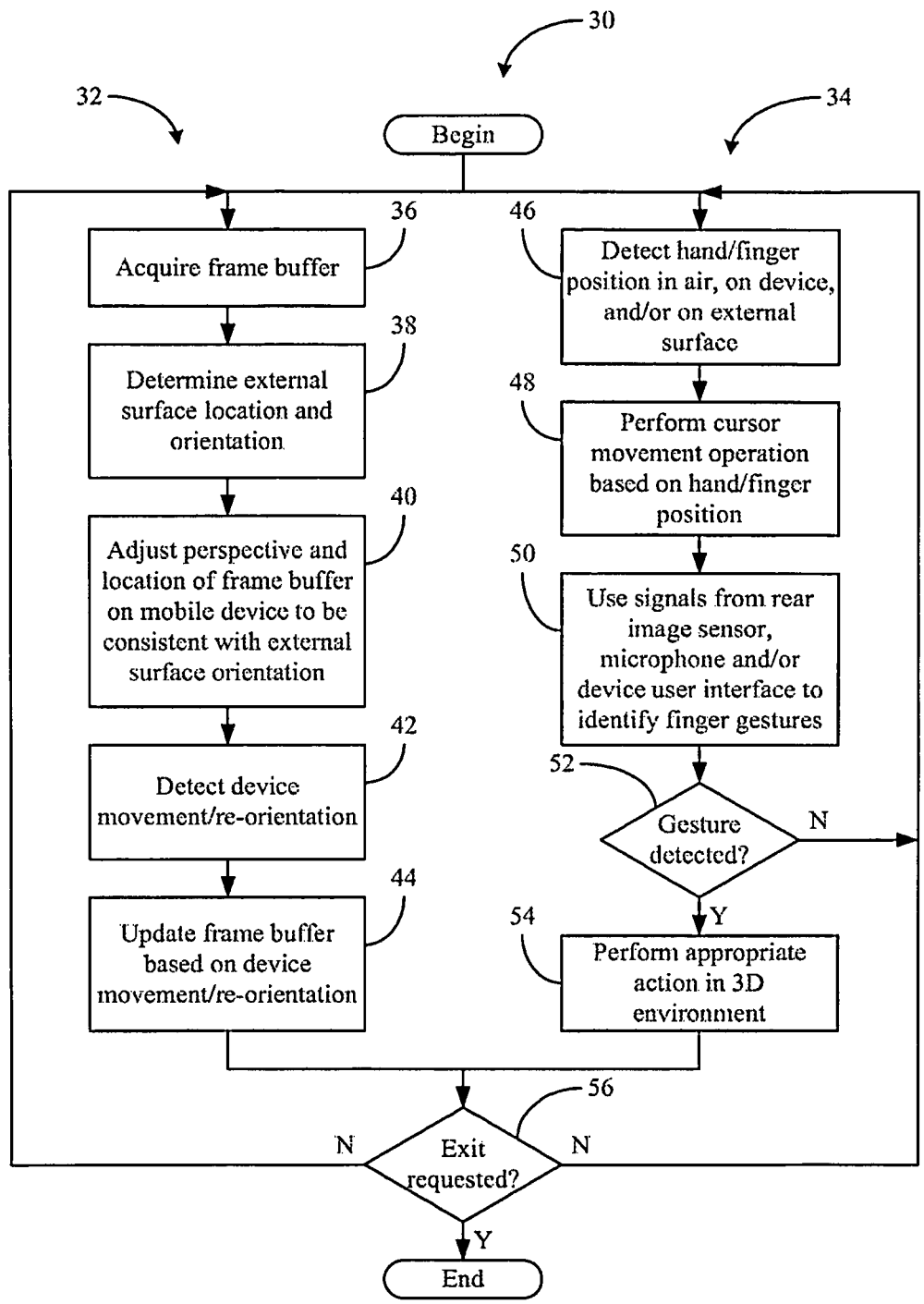
FIG. 3 is a flowchart of an example of a method of using a 3D virtual environment to enable a user to interact with a mobile device according to an embodiment.

Turning now to FIG. 3, a method 30 of using a 3D environment to enable a user to interact with a mobile device is shown. The method 30 may be implemented in a mobile device such as the mobile platform 10 (FIGS. 1 and 2) as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 30 may be written in any combination of one or more programming languages, including an object oriented programming language such as Java, Smalltalk, C++ or the like and conventional procedural programming languages, such as the "C" programming language or similar programming languages.

In general, a device portion 32 of the method 30 may involve rendering and modifying the 3D environment based on device movements, and an interaction portion 34 of the method 30 may involve rendering and modifying the 3D environment based on user interactions. Illustrated processing block 36 provides for acquiring frame buffer data, wherein the frame buffer data may be associated with the pixel data used to render one or more image/video frames of the 3D environment via a screen of the mobile device 10. The location and orientation of an external surface may be determined at block 38. Alternatively, the virtual environment may be rendered at an in-air location in which the determination at block 38 might be bypassed.

Block 40 can provide for adjusting the perspective and location of the frame buffer data so that it is consistent with the orientation of the external surface. Thus, for example, if the external surface is a physical desktop positioned at a certain angle (e.g., 45°) to the user, the frame buffer data may also be tilted at the same/similar angle. A movement and/or re-orientation of the mobile device may be detected at block 42, wherein detection of the movement might be achieved by a using one or more signals from a motion sensor, rear image sensor, front image sensor, etc., of the mobile device, as already discussed. Illustrated block 44 updates the frame buffer based on the device movement/re-orientation. Therefore, the update may involve panning left/right, zooming in/out, maintaining the proper perspective with respect to the external surface orientation, and so forth.

In the interaction portion 34 of the method 30, block 46 may provide for detecting a hand/finger position (e.g., in-air, on device, on external surface), wherein a cursor movement operation may be conducted at block 48 based on the hand/finger position. Additionally, one or more signals from the rear image sensor, microphone and/or mobile device (e.g., UI, button, etc.) may be used to identify one or more finger gestures on the part of the user at block 50. If it is determined at block 52 that a gesture has been detected, illustrated block 54 performs the appropriate action in the 3D environment. Thus, block 54 might involve conducting a click operation, drag and drop operation, pinch operation, selection operation, object rotation operation, and so forth. Block 56 provides for determining whether an exit from the virtual environment interaction process has been requested. If either no exit has been requested or no gesture has been detected, the illustrated method 30 repeats in order to track device movements and hand movements, and updates the 3D environment accordingly.

Figure 4:
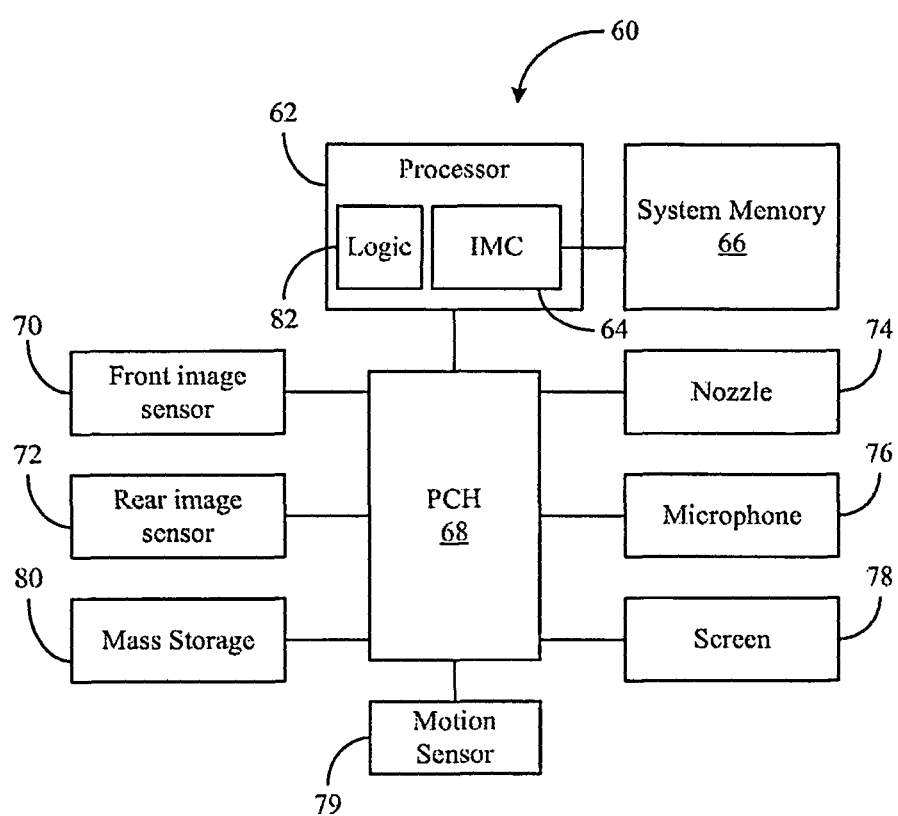
FIG. 4 is block diagram of an example of a mobile device according to an embodiment.

FIG. 4 shows a mobile device 60. The mobile device 60 may be part of a platform having computing functionality (e.g., personal digital assistant/PDA, laptop, smart tablet), communications functionality (e.g., wireless smart phone), imaging functionality, media playing functionality (e.g., smart television/TV), or any combination thereof (e.g., mobile Internet device/MID). The mobile device 60 could be readily substituted for the mobile device 10 (FIGS. 1 and 2), already discussed. In the illustrated example, the device 60 includes a processor 62 having an integrated memory controller (IMC) 64, which may communicate with system memory 66. The system memory 66 may include, for example, dynamic random access memory (DRAM) configured as one or more memory modules such as, for example, dual inline memory modules (DIMMs), small outline DIMMs (SODIMMs), etc.

The illustrated device 60 also includes a platform controller hub (PCH) 68; sometimes referred to as a Southbridge of a chipset, that functions as a host device and may communicate with, for example, a front image sensor 70, a rear image sensor 72, an air nozzle 74, a microphone 76, a screen 78, a motion sensor 79, and mass storage 80 (e.g., hard disk drive/HDD, optical disk, flash memory, etc.). The illustrated processor 62 may execute logic 82 that is configured to display a 3D environment via the screen 78, identify user interactions with an area behind the mobile device 60, and modify the 3D environment based at least in part on the user interactions. The 3D environment may also be modified based on movements of the mobile device 60, wherein one or more signals from the front image sensor 70, the rear image sensor 72, the microphone 76 and/or the motion sensor 79 might be used to identify the user interactions and/or the mobile device movements. In addition, user interactions with the mobile device 60 may be identified based on one or more signals from a UI implemented via the screen 78 (e.g., touch screen) or other appropriate interface such as the button 22 (FIG. 1), as already discussed. Moreover, the logic 82 may use the nozzle 74 to provide tactile feedback to the user in response to the user interactions.

Thus, techniques described herein may enable a full desktop computer experience using a small form factor mobile device such as a smart phone. By using 3D display technology and/or 3D rendering mechanisms, it is possible to enable the user to interact through a mobile device, looking at its screen, while interacting with the space above, behind, below and beside the device's screen. In addition, the screen may be viewable only to the individual looking directly into it, therefore enhancing privacy with respect to the user interactions (e.g., similar to privacy filters that may be designed for laptop displays).

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A mobile device comprising:
a screen;
a sensor, wherein the sensor is to include one or more of a motion sensor and a front image sensor; and
logic to,
  display a three-dimensional (3D) environment via the screen,
  identify a first user interaction with an area behind the mobile device that is to include a selection of one or more of a region of interest and a virtual object in the 3D environment,
  use one or more signals from at least one of the motion sensor and the front image sensor to identify a movement of the mobile device in response to the selection, and
  modify the 3D environment based at least in part on the first user interaction that is to include the selection and the movement of the mobile device in response to the selection.

2. The mobile device of claim 1, wherein the first user interaction is to include a hand movement that is to touch at least one of an in-air location associated with one or more of the region of interest and the virtual object when the 3D environment is an in-air environment and an external surface associated with one or more of the region of interest and the virtual object when the 3D environment is pinned to the external surface.

3. The mobile device of claim 1, further including an air nozzle, wherein the logic is to use the air nozzle to provide tactile feedback if the first user interaction is a hand movement relative to an in-air location.

4. The mobile device of claim 1, further including a rear image sensor, wherein the logic is to use one or more signals from the rear image sensor to identify the first user interaction.

5. The mobile device of claim 1, further including a microphone, wherein the logic is to use one or more signals from the microphone to identify the first user interaction.

6. The mobile device of claim 1, wherein the logic is to perform one or more of a cursor movement operation, a click operation, a drag and drop operation, a pinch operation, a selection operation and an object rotation operation to modify the 3D environment based at least in part on the first user interaction.

7. The mobile device of claim 1, wherein the logic is to,
use one or more signals from the motion sensor to identify a movement of the mobile device including a tilt of the mobile device with respect to one or more of the region of interest and the virtual object to pan and a change in distance with respect to one or more of the region of interest and the virtual object to zoom, and
use one or more signals from the front image sensor to identify a movement of the mobile device including a tilt of the mobile device with respect to a user that is to view the 3D environment via the screen to pan and a change in distance with respect to the user that is to view the 3D environment via the screen to zoom.

8. The mobile device of claim 1, wherein the 3D environment is to include a virtual desktop computer environment that is substantially larger than the screen of the mobile device.

9. The mobile device of claim 1, wherein the sensor is to include a user interface of the mobile device, and wherein the logic is to,
use one or more signals from the user interface of the mobile device to identify a movement of the user interface of the mobile device in response to the selection, and
modify the 3D environment based at least in part on the first user interaction that is to include the selection and the movement of the user interface of the mobile device in response to the selection.

10. An apparatus comprising:
logic to,
display a three-dimensional (3D) environment via a screen of a mobile device,
identify a first user interaction with an area behind the mobile device that is to include a selection of one or more of a region of interest and a virtual object in the 3D environment,
use one or more signals from at least one of a motion sensor and a front image sensor of the mobile device to identify a movement of the mobile device in response to the selection, and
modify the 3D environment based at least in part on the first user interaction that is to include the selection and the movement of the mobile device in response to the selection.

11. The apparatus of claim 10, wherein the first user interaction is to include a hand movement that is to touch at least one of an in-air location associated with one or more of the region of interest and the virtual object when the 3D environment is an in-air environment and an external surface associated with one or more of the region of interest and the virtual object when the 3D environment is pinned to the external surface.

12. The apparatus of claim 10, wherein the logic is to use one or more signals from at least one of a rear image sensor and a microphone of the mobile device to identify the first user interaction.

13. The apparatus of claim 10, wherein the logic is to use an air nozzle of the mobile device to provide tactile feedback if the first user interaction is a hand movement relative to an in-air location.

14. The apparatus of claim 10, wherein the logic is to perform one or more of a cursor movement operation, a click operation, a drag and drop operation, a pinch operation, a selection operation and an object rotation operation to modify the 3D environment based at least in part on the first user interaction.

15. The apparatus of claim 10, wherein the 3D environment is to include a virtual desktop computer environment that is substantially larger than the screen of the mobile device.

16. The apparatus of claim 10, wherein the logic is to,
use one or more signals from a user interface of the mobile device to identify a movement of the user interface of the mobile device in response to the selection, and
modify the 3D environment based at least in part on the first user interaction that is to include the selection and the movement of the user interface of the mobile device in response to the selection.

17. The apparatus of claim 16, wherein the click operation is to include a computer mouse click operation.

18. A non-transitory computer readable storage medium comprising a set of instructions which, if executed by a processor, cause a mobile device to:
display a three-dimensional (3D) environment via a screen of the mobile device;
identify a first user interaction with an area behind the mobile device that is to include a selection of one or more of a region of interest and a virtual object in the 3D environment;
use one or more signals from at least one of a motion sensor and a front image sensor of the mobile device to identify a movement of the mobile device in response to the selection; and
modify the 3D environment based at least in part on the first user interaction that is to include the selection and the movement of the mobile device in response to the selection.

19. The medium of claim 18, wherein the first user interaction is to include a hand movement that is to touch at least one of an in-air location associated with one or more of the region of interest and the virtual object when the 3D environment is an in-air environment and an external surface associated with one or more of the region of interest and the virtual object when the 3D environment is pinned to the external surface.

20. The medium of claim 18, wherein the instructions, if executed, cause the mobile device to use one or more signals from at least one of a rear image sensor and a microphone of the mobile device to identify the first user interaction.

21. The medium of claim 18, wherein the instructions, if executed, cause the mobile device to use an air nozzle of the mobile device to provide tactile feedback if the first user interaction is a hand movement relative to an in-air location.

22. The medium of claim 18, wherein the instructions, if executed, cause the mobile device to perform one or more of a cursor movement operation, a click operation, a drag and drop operation, a pinch operation, a selection operation and an object rotation operation to modify the 3D environment based on at least in part the first user interaction.

23. The medium of claim 18, wherein the 3D environment is to include a virtual desktop computer environment that is substantially larger than the screen of the mobile device.

24. The medium of claim 18, wherein the instructions, if executed, cause the mobile device to:
use one or more signals from a user interface of the mobile device to identify a movement of the user interface of the mobile device in response to the selection; and
modify the 3D environment based at least in part on the first user interaction that is to include the selection and the movement of the user interface of the mobile device in response to the selection.

25. A computer implemented method comprising:
displaying a three-dimensional (3D) environment via a screen of a mobile device;
identifying a first user interaction with an area behind the mobile device including a selection of one or more of a region of interest and a virtual object in the 3D environment;
using one or more signals from at least one of a motion sensor and a front image sensor of the mobile device to identify a movement of the mobile device in response to the selection; and
modifying the 3D environment based at least in part on the first user interaction including the selection and the movement of the mobile device in response to the selection.

26. The method of claim 25, wherein the first user interaction includes a hand movement touching at least one of an in-air location associated with one or more of the region of interest and the virtual object when the 3D environment is an in-air environment and an external surface associated with one or more of the region of interest and the virtual object when the 3D environment is pinned to the external surface.

27. The method of claim 25, further including:
using one or more signals from at least one of a rear image sensor and a microphone of the mobile device to identify the first user interaction; and
using an air nozzle of the mobile device to provide tactile feedback if the first user interaction is a hand movement relative to the in-air location.

28. The method of claim 25, wherein modifying the 3D environment includes performing one or more of a cursor movement operation, a click operation, a drag and drop operation, a pinch operation, a selection operation and an object rotation operation.

29. The method of claim 25, wherein the 3D environment includes a virtual desktop computer environment that is substantially larger than the screen of the mobile device.

30. The method of claim 25, further including:
using one or more signals from a user interface of the mobile device to identify movement of the user interface of the mobile device in response to the selection; and
modifying the 3D environment based at least in part on the first user interaction including the selection and the movement of the user interface of the mobile device in response to the selection.

31. A mobile device comprising:
a screen;
a sensor, wherein the sensor is to include a user interface of the mobile device; and
logic to,
display a three-dimensional (3D) environment via the screen,
identify a first user interaction with an area behind the mobile device that is to include a selection of one or more of a region of interest and a virtual object in the 3D environment,
use one or more signals from the user interface of the mobile device to identify a movement of the user interface of the mobile device in response to the selection, and
modify the 3D environment based at least in part on the first user interaction that is to include the selection and the movement of the user interface of the mobile device in response to the selection.

32. An apparatus comprising:
logic to,
display a three-dimensional (3D) environment via a screen of a mobile device,
identify a first user interaction with an area behind the mobile device that is to include a selection of one or more of a region of interest and a virtual object in the 3D environment,
use one or more signals from a user interface of the mobile device to identify a movement of the user interface of the mobile device in response to the selection, and
modify the 3D environment based at least in part on the first user interaction that is to include the selection and the movement of the user interface of the mobile device in response to the selection.

33. A non-transitory computer readable storage medium comprising a set of instructions which, if executed by a processor, cause a mobile device to:
display a three-dimensional (3D) environment via a screen of the mobile device;
identify a first user interaction with an area behind the mobile device that is to include a selection of one or more of a region of interest and a virtual object in the 3D environment;
use one or more signals from a user interface of the mobile device to identify a movement of the user interface of the mobile device in response to the selection; and
modify the 3D environment based at least in part on the first user interaction that is to include the selection and the movement of the user interface of the mobile device in response to the selection.

34. A computer implemented method comprising:
displaying a three-dimensional (3D) environment via a screen of a mobile device;
identifying a first user interaction with an area behind the mobile device including a selection of one or more of a region of interest and a virtual object in the 3D environment;
using one or more signals from a user interface of the mobile device to identify movement of the user interface of the mobile device in response to the selection; and
modifying the 3D environment based at least in part on the first user interaction including the selection and the movement of the user interface of the mobile device in response to the selection.

\* \* \* \* \*